United States Patent
Kurozumi et al.

[11] 3,892,630
[45] July 1, 1975

[54] PROCESS FOR PREPARING HYDROXYCYCLOPENTENONE DERIVATIVES USING MICROORGANISMS

[75] Inventors: Seizi Kurozumi; Takashi Toru, both of Hino; Sachio Ishimoto, Tokyo, all of Japan

[73] Assignee: Teijin Ltd., Osaka, Japan

[22] Filed: May 24, 1974

[21] Appl. No.: 473,208

[30] Foreign Application Priority Data
May 28, 1973 Japan............................ 48-58537

[52] U.S. Cl................................. 195/51 R; 195/30
[51] Int. Cl............................................. C07b 29/02
[58] Field of Search............................ 195/51 R, 30

[56] References Cited
UNITED STATES PATENTS
3,415,716  12/1968  Berger et al. ................ 195/51 R

*Primary Examiner*—Alvin E. Tanenholtz
*Attorney, Agent, or Firm*—Sherman & Shalloway

[57] ABSTRACT

A process for preparing hydroxycyclopentenone derivatives, which comprises cultivating a microorganism belonging to the genus Aspergillus in a medium containing a cyclopentenone derivative expressed by the formula (1)

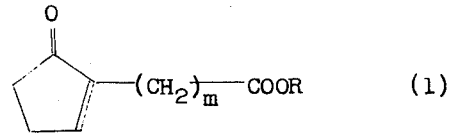

(1)

wherein R is a hydrogen atom or a lower alkyl group, and $m$ is an integer of 1 to 6, to form in said medium a hydroxycyclopentenone derivative expressed by the formula (2)

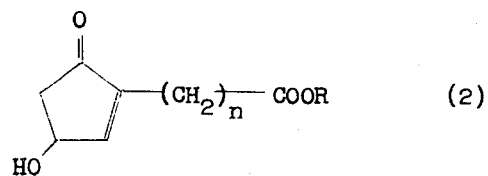

(2)

wherein R is the same as defined above, and $n$ is equal to $m$ or, $(m - 2)$ when $m$ is from 3 to 6, and then recovering the hydroxycyclopentenone derivative.

12 Claims, No Drawings

PROCESS FOR PREPARING HYDROXYCYCLOPENTENONE DERIVATIVES USING MICROORGANISMS

This invention relates to a process for preparing hydroxycyclopentenone derivatives from cyclopentenone derivatives using microorganisms. More specifically, the invention relates to a process for preparing hydroxycyclopentenone derivatives, which comprises cultivating a microorganism belonging to the genus Aspergillus in a medium containing a cyclopentenone derivative expressed by the formula (1)

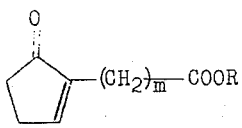 (1)

wherein R is a hydrogen atom or a lower alkyl group, and $m$ is an integer of 1 to 6,
to form in said medium a hydroxycyclopentenone derivative expressed by the formula (2)

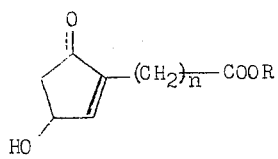 (2)

wherein R is the same as defined above, and $n$ is equal to $m$, or $(m - 2)$ where m is 3 to 6,
and recovering the hydroxycyclopentenone derivative.

The hydroxycyclopentenone derivative obtained by the process of this invention is a compound which is useful, for example, as an intermediate for preparing prostaglandin or its homologs. Prostaglandin has attracted great attention in recent years in the medical, pharmacological and chemical fields because of having a wide range of physiological activities such as a hypotensive action, a smooth muscle shrinking action or an anti-inflammatory action.

It is also known that the compound expressed by formula (2) produced by the process of this invention, for example, a compound of the formula (2) in which $n$ is 6, has physiological activities such as inhibiting the agglutination of blood platelets or a hypotensive action.

This compound can be reacted, for example, with an organic metal compound of the following formula (3)

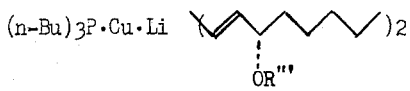

wherein n-Bu represents an n-butyl group, and $R'''$ is a protective group such as a tetrahydropyranyl, to form a precursor of prostaglandin $E_1$.

Hydroxycyclopentenone derivatives have previously been prepared, for example, by a method comprising treating a cyclopentenone derivative of the formula (1) above with N-bromosuccinimide and subjecting it to several synthetic chemical steps to obtain the desired product [Rec. Trav. Chim., 87, 1421 (1968)], a method comprising treating a certain cyclopentanetrione in several synthetic chemical steps to form the desired product [Tetrahedron Letters, 2627 (1972)], or a method involving oxidizing a certain cyclopentadiene derivative to obtain the product and byproducts [Chem. Commun., 240 (1972)].

However, these known methods require several synthetic chemical steps in order to obtain the final desired product, and also have the defect that the yield of the product is poor, and the product is a mixture of a d-isomer and an l-isomer.

We have made investigations into the production of the hydroxycyclopentenone derivative of the formula (2) utilizing the metabolic action of a microorganism instead of relying on the complicated synthetic steps mentioned above, and unexpectedly found that the hydroxycyclopentenone derivatives can be easily produced by using microorganisms belonging to the genus Aspergillus.

Any microorganisms belonging to the genus Aspergillus can be used in this invention, but *Aspergillus niger*, *Aspergillus tamarii*, and *Aspergillus flavus* have been found especially suitable. Of these, *Aspergillus niger* can be used especially advantageously.

When a strain of *Aspergillus niger* is cultivated in accordance with this invention in a medium containing the cyclopentenone derivative of the formula (1), the cyclopentenone derivative of formula (1) is converted to the hydroxycyclopentenone derivative of formula (2) in a very high yield by the metabolic action of the above strain. This product can be easily separated from the culture medium and purified by known methods.

A method has already been known to produce a hydroxyl derivative using a strain belonging to *Aspergillus niger* in which cinerolone of formula (5) is prepared from cinerone of formula (4) (Applied Microbiology, May 1969, pp. 714–717).

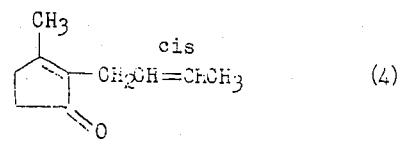 (4)

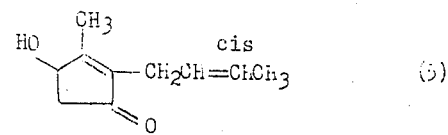 (5)

The 2-cyclopenten-1-on derivative of formula (1) used as a substrate in the present invention has a functional group not seen in the cinerone of formula (4), since the end of the side chain at the 2-position is a carboxyl or carboalkoxy group. The above literature reference reports that the conversion to the cinerolone of formula (5) is about 60%, but the yield of the isolated cinerolone is about 13%. In contrast, according to the present invention in which a strain belonging to *Aspergillus niger* is used, the hydroxycyclopentenone derivative of formula (2) in which the 4-position of the 2-cyclopenten-1-on derivative is selectively substituted by a hydroxyl group can be produced in a gross yield of at least 60%, and under preferred conditions, about 70 to 95%.

Some more specific examples of the strains used in this invention are:

*Aspergillus niger* ATCC 9142 (American Type Culture Collection)

*Aspergillus niger* IFO 6428 (Institute for Fermentation, Osaka, Japan),
*Aspergillus tamarii* ATCC 1005, and
*Aspergillus flavus* ATCC 12073.

However, the invention is not limited to these specific strains.

In the process of this invention, any medium generally used for cultivating molds can be used. Preferred media are those containing d-glucose as a carbon source for the growth of cells. In order to prevent a decrease in the pH of the culture broth, a basic substance such as sodium hydroxide or calcium carbonate can be used. In view of the convenience of operation, calcium carbonate is preferably used.

The suitable amount of calcium carbonate added is 0.01 to 1.0% by weight based on the culture broth. If the amount is less than 1.0% by weight, there is hardly any appreciable effect in preventing the decrease of the pH, but sufficient effects are observed for the promotion of the growth of cells.

The addition of a basic substance, especially calcium carbonate, makes it possible to prevent the reaction of the pH of the culture medium as compared with the case of not adding it, and therefore, to better the growth of cells.

The cultivation can be carried out at room temperature, preferably at 10° to 40°C., especially at about 25° to 30°C.

The composition of the culture medium and the cultivating conditions that can be used for cultivating a strain of the genus Aspergillus are described in detail, for example, in "Physiology of Fungi", V. W. Cochrane, Academi Press and "The Fungi" Vol. I–IVA, Ainworth, Academi Press. In the present invention, all of the media and cultivating conditions disclosed in these references can be utilized. In short, culture media of any composition and any cultivating conditions can be used in the present invention so long as microorganisms belonging to the genus Aspergillus can fully grow in a medium containing a compound (substrate) expressed by the above formula (1).

In the present invention, any cyclopentenone derivative expressed by the formula (1) can be used as a substrate. The preferred substrate is a compound expressed by the following formula (1-a).

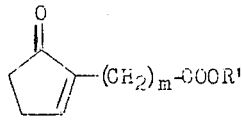
(1-a)

wherein R' is a hydrogen atom, a methyl group or an ethyl group, and m is an integer of 1 to 6.

Of compounds of formula (1-a), those in which R' is a hydrogen atom or a methyl or ethyl group and m is 6 are suitable. Furthermore, those in which R' is a hydrogen atom are generally advantageous as substrates.

The following methods are available, for example, for converting the substrate.

A. A method in which a strain is inoculated into a medium containing the substrate, and cultivated.

B. A method in which a strain is cultivated while successively adding the substrate with the growth of the cells of the strain.

C. A method in which the cells of a strain are grown to some extent, and thereafter the substrate is added to continue the cultivation of the strain. Of these, the method (A) is preferred because of a high conversion of the substrate.

The concentration of the substrate is such that by the inoculation of a strain, the growth of its cells can be observed. For example, the suitable concentration of the substrate is 0.05 to 4% by weight, especially about 0.08 to 2% by weight, based on the culture broth when the substrate is a cyclopentenone derivative of the formula (1) in which R is a hydrogen atom, and the method (A) is employed. When using a cyclopentenone derivative of formula (1) in which R is a lower alkyl ester, the preferred concentration of the substrate is about 0.01 to 0.5% by weight, especially 0.02 to 0.1% by weight based on the culture broth.

According to the present invention, the hydroxycyclopentenone derivative of formula (2) can be formed in the culture medium containing the compound of formula (1) as a substrate by cultivating a strain belonging to the genus Aspergillus, preferably a strain belonging to *Aspergillus niger*, *Aspergillus tamarii* or *Aspergillus flavus*, especially preferably the *Aspergillus niger* in the culture medium.

When the compound of formula (1-a) which is a preferred substrate is used, a hydroxycyclopentenone derivative expressed by the following formula (2-a) can be obtained.

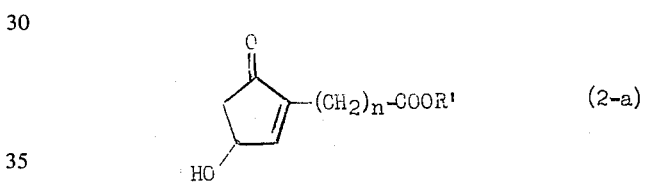

wherein R' is the same as defined with respect to the formula (1-a), and n is equal to m, or (m−2) when m is 3 to 6.

As is clear from the definition of n in the formula (2) or (2-a) above, when the compound of formula (1) or (1-a) is used as a substrate, there can be obtained a hydroxycyclopentenone derivative of the formula (2) or (2-a) having the same carbon atoms as the side-chain expressed by $-(CH_2)_{\overline{m}}COOR$ or $-(CH_2)_{\overline{m}}COOR'$, or a side-chain having methylene groups ($-CH_2-$) the number of which is 2 less than the above side-chain.

When an ester of the formula (1) or (1-a) in which R or R' is a lower alkyl group, preferably a methyl or ethyl group, is used as the substrate, there can be formed a hydroxycyclopentenone derivative of the formula (2) or (2-a) in the form of the ester or in the form in which the ester is decomposed to a free carboxyl group.

The difference of the product depends mainly on the length of the cultivating time. For example, when a strain belonging to *Aspergillus niger* is used and the cultivation time is up to about 40 hours, a hydroxycyclopentenone derivative in which the number of methylene groups constituting the side-chain does not change [n is equal to m in the formula (2) or (2-a)] is obtained as a main product. If the cultivation time is longer, a hydroxycyclopentenone derivative having methylene groups 2 less in number at the side-chain [n is (m − 2) in formula (2) or (2-a)] is obtained as a main product.

However, when a compound of formula (1) or (1-a) in which m is 1 is used as a substrate, a hydroxycyclopentenone derivative of the same number of methylene groups can be obtained even if the cultivation time is longer.

When a strain belonging to *Aspergillus niger* is cultivated for up to 40 hours using an ester of a cyclopentenone derivative as a substrate, a hydroxycyclopentenone derivative in which the ester group is not hydrolyzed can be obtained. But if the cultivation time is longer, there is obtained a hydroxycyclopentenone having a carboxyl group as a result of the hydrolysis of the ester group.

The isolation of the product can be effected easily in a customary manner. For example, the crude product can be easily recovered by removing the cells from the culture broth by filtration, washing the cells with a general organic solvent difficultly soluble in water (for example, ether, chloroform, ethyl acetate, benzene, hexane or cyclohexanone), extracting the product from the aqueous phase of the filtrate with the same organic solvent, and then working up the extracted product in a customary manner.

In order to recover the product with good efficiency, it is desirable to employ a salting-out operation and a continuous extracting operation.

The crude product is almost pure, but if it is desired to be purified further, it is subjected, for example, to column chromatography, preparative thin-layer chromatography, or recrystallization to form a pure hydroxycyclopentenone derivative. If the product is a hydroxycyclopentenone derivative containing a carboxyl group, the use of a recrystallization method simplifies the procedure.

According to the process of this invention described above, the hydroxycyclopentenone derivative of the general formula (2), preferably (2-a) can be obtained in a single step in a gross yield of at least 60%, especially at least 70% (when a strain belonging to *Aspergillus niger* is used) from the cyclopentenone derivative expressed by the general formula (1), preferably (1-a).

The resulting product has optical activity because it has been prepared by a converting method based on microorganisms, and exhibits superior features in this regard also.

The following Examples illustrate the present invention in greater detail.

EXAMPLE 1

150 mg of 2-(6'-carboxyhexyl)-2-cyclopenten-1-one and 310 mg of calcium carbonate were placed in a 500 ml. three-necked flask containing 100 ml. of a culture broth having the following composition, and after sterilizing for 10 minutes at 120°C., one platinum loopful of *Aspergillus niger* ATCC 9142 was inoculated, and cultivated for 39 hours at 30°C. on a rotary shaker.

| Composition of one liter of the culture broth | |
|---|---|
| Glucose | 20 g |
| Potassium primary phosphate | 1.5 g |
| Magnesium sulfate heptahydrate | 1.5 g |
| Ammonium nitrate | 1.0 g |
| Lactalbumin | 1.0 g |
| Corn steep liquor solid | 2.0 g |
| Soluble component of autolyzed yeast | 0.5 g |
| -Glutamic acid | 0.5 g |
| Zinc sulfate heptahydrate | 10 mg |

| -Continued | |
|---|---|
| Composition of one liter of the culture broth | |
| Distilled water to make | 1 liter |
| pH adjusted to 7.0 with NaOH | |

The culture broth after the end of cultivation had a pH of 4.55. The cells were separated from the culture broth by filtration, and washed with ether. The filtrate was extracted with ether, and dried with anhydrous sodium sulfate, after which the solvent was evaporated off at reduced pressure to give 98 mg of a crude product. Analysis of the product by thin-layer chromatography (to be abbreviated hereinafter as TLC; adsorbent silica, gel; developing solvent, ethyl ether-isopropyl ether-acetic acid = 70:35:3 volume ratio) showed a large spot at Rf 0.10 and two small spots at Rf 0.18 and 0.27.

The crude product was recrystallized from a mixture of petroleum ether and ethyl ether at −40°C. to afford 62 mg of crystals having a melting point of 15 to 20°C.

The resulting product had the following characteristics.

TLC: Rf 0.10
NMR [60 MHz, CDCl$_3$, δ (ppm)]
  near 1.40 (8H; methylene group)
  near 2.5 (6H; carbonyl group or methylene group adjacent to the double bond)
  near 4.0 (1H; methine proton bonded to the hydroxyl group)
  near 6.20 (2H; proton of carboxyl group and hydroxyl group)
  7.35 (1H; olefin proton)
IR (liquid film, cm$^{-1}$)
  3300 (hydroxyl group, carboxyl group)
  1700 (carboxyl group)
  1680, 1620 (conjugated enone)
UV (λmax, in methanol): 229 nm
$[\alpha]_D^{20} = +8°$ (in methanol)

From the above spectrum data, the resulting product was identified as 2-(6'-carboxyhexyl)-4-hydroxy-2-cyclopenten-1-one. Yield 40%.

Referential Example 300 mg (1.4 millimols) of 2-(6'-carboxyhexyl)-4-hydroxy-2-cyclopenten-1-one was dissolved in 50 ml. of ethyl ether, and a slight excess of an ether solution of diazomethane (1.5 millimols) was gradually added at 0°C. The mixture was stirred at room temperature for one hour, and post-treated in accordance with a customary method to afford 305 mg of a crude product, which was identified from its spectrum data as 2-(6'-carbomethoxyhexyl)-4-hydroxy-2-cyclopenten-1-one. The methyl ester of this product had the following characteristics.

TLC: Rf 0.30
NMR [(60 MH$_2$, CDCl$_3$, δ (ppm)]:
  near 1.40 (8H; methylene group)
  near 2.5 (6H; carbonyl group or methylene group adjacent to the double bond)
  3.65 (1H; hydroxyl group)
  3.70 (3H; methyl group of carbomethoxy group)
  4.00 (1H; methine proton to which a hydroxyl group is bonded)
  7.30 (1H; olefin proton)
IR (liquid film, cm$^{-1}$):

3350 (hydroxyl group)
1720 (ester carboxyl group)
1680, 1620 (conjugated enone)
UV (λmax, in methanol): 229 nm
$[\alpha]_D^{20} = +6°$ (in methanol)

EXAMPLE 2

263 mg of 2-(6'-carboxyhexyl)-2-cyclopenten-1-one was divided into three equal portions, and these portions were placed respectively in three 500 ml. three-necked flasks each containing 100 ml. of a culture broth of the same composition as used in Example 1. 100 mg of calcium carbonate was added to one of the flasks (to be referred to as a first flask). After sterilizing for 10 minutes at 120°C., one platinum loopful of *Aspergillus niger* ATCC 9142 was inoculated in each of the flasks, and cultivated for 35 hours at 30°C. on a rotary shaker. After the cultivation, the pH of the culture broth was 4.60, 4.25 and 4.10 for the first flask, second flask and third flask respectively. The growth of the cells was the best in the first flask to which calcium carbonated had been added.

These culture broths were combined, and in the same way as in Example 1, the cells were separated by filtration. The filtrate was extracted with ether, and dried with anhydrous sodium sulfate. The solvent was evaporated off at reduced pressure to afford 177 mg of a crude product in a yield of 62%. Analysis of this crude product by TLC showed a large spot at Rf 0.10, and two very small spots at Rf 0.18 and 0.28. The spot at Rf 0.10 of the crude product was isolated by preparative thin-layer chromatography (adsorbent, silica gel). From its NMR and IR, the spot at Rf 0.10 was identified as 2-(6'-carboxyhexyl)-4-hydroxy-2-cyclopenten-1-one.

EXAMPLE 3

377 mg of 2-(6'-carboxyhexyl)-2-cyclopenten-1-one was added to 500 ml. of a culture broth of the same composition as in Example 1 which however did not contain calcium carbonate. *Aspergillus niger* ATCC 9142 was cultivated in this culture broth for 36 hours at 30°C. in the same way as set forth in Example 1. Then, the culture broth was saturated with sodium chloride, and continuously extracted with ether for 8 hours, followed by drying and concentrating in a customary manner to give 383 mg of a crude product. After the cultivation, the culture broth had a pH of 3.10. Analysis of the crude product by TLC showed a large spot (the desired product) at Rf 0.10, and two small spots at Rf 0.18 and 0.27. The spot at Rf 0.10 was isolated in the same way as in Example 2, and from its TLC, NMR and IR, it was identified as 2-(6'-carboxyhexyl)-4-hydroxy-2-cyclopenten-1-one.

EXAMPLE 4

20 mg of 2-(6'-carboxyhexyl)-2-cyclopenten-1-one was added to 200 ml. of a culture broth of the same composition as in Example 1, and without adding calcium carbonate, *Aspergillus niger* ATCC 9142 was cultivated for 30 hours at 30°C. in the same way as in Example 1. After the growth of the cells, 205 mg of 2-(6'-carboxyhexyl)-2-cyclopenten-1-one was further added aseptically, and then the cultivation was continued for an additional 15 hours. The pH of the culture broth at this time was 3.55. It was treated in the same way as in Example 1 to afford 244 mg of a crude product. Analysis of this crude product by TLC showed a small spot at Rf 0.10, and a large spot of the starting material at Rf 0.46. Each component was isolated using the procedure described in Example 2, and about 10 mg of a component corresponding to Rf 0.10 was obtained. From TLC, NMR, and IR, this component was identified as 2-(6'-carboxyhexyl)-4-hydroxy-2-cyclopenten-1-one.

EXAMPLE 5

39 mg of 2-(6'-carboxyhexyl)-2-cyclopenten-1-one was added to 100 ml. of a culture broth of the same composition as in Example 1, and without adding calcium carbonate, *Aspergillus niger* ATCC 9142 was cultivated in the culture broth for 55 hours at 30°C. in the same way as in Example 1. After the cultivation, the culture broth was treated in the same way as in Example 1 to afford 20 mg of a crude product. After the cultivation, the pH of the culture broth was 2.7. Analysis of the product by TLC showed a very small spot at Rf 0.10, and a large spot at Rf 0.27.

The resulting crude product was recrystallized from a mixture of ether and petroleum ether to afford 5 mg of crystals having a melting point of 95° to 97°C. This product had the following characteristics.

TLC: Rf 0.27
NMR [60 MHz, CDCl$_3$, δ (ppm)]:
  1.40 (4H; methylene group)
  2.0–2.8 (6H; carbonyl group or methylene group adjacent to the double bond)
  4.20 (1H; methine proton to which a hydroxyl group is attached)
  7.1 (2H; proton of carboxyl group and hydroxyl group)
  7.40 (1H; olefin proton)
IR (KBr, cm$^{-1}$):
  near 3300 (hydroxyl group)
  1720 (carboxyl group)
  1680, 1620 (conjugated enone)
UV (λmax, in methanol): 227 nm From the above spectrum data, the resulting product was identified as 2-(4'-carboxybutyl)-4-hydroxy-2-cyclopenten-1-one. This is the consequence of the β-oxidation of 2-(6'-carboxyhexyl)-4-hydroxy-2-cyclopenten-1-one to become a compound having carbon atoms the number of which is smaller by two.

EXAMPLE 6

After sterilization, one platinum loopful of *Aspergillus niger* ATCC 9142 was inoculated in 100 ml. of a culture broth of the same composition as used in Example 1, and pre-cultured at 30°C. for 24 hours to grow the cells. Then, 50 mg of 2-(6'-carboxyhexyl)-2-cyclopenten-1-one was added aseptically, and the cultivation was continued for an additional 24 hours. At this time, the pH of the culture broth was 3.20. The culture broth was treated in the same way as in Example 1 to afford 42 mg of a crude product. Analysis of the crude product by TLC showed spots of almost the same size at Rf 0.10 (the product) and Rf 0.46 (the starting material), and a small spot at Rf 0.27. The spot at Rf 0.10 was isolated by the method described in Example 2, and from its TLC, NMR and IR, it was identified as 2-(6'-carboxyhexyl)-4-hydroxy-2-cyclopenten-1-one.

EXAMPLE 7

50 mg of 2-(6'-carboxyhexyl)-2-cyclopenten-1-one was put into 100 ml. of a culture broth of the same composition as used in Example 1, and after sterilization for 10 minutes at 120°C., one platinum loopful of *Aspergillus niger* ATCC 9142 was inoculated, and cultivated for 27 hours at 28°C. on a rotary shaker. After the cultivation, the pH of the culture broth was 3.42. It was treated in the same way as in Example 1 to afford 46 mg of a crude product. Analysis of the crude product by TLC showed a large spot (desired product) at Rf 0.10, and two very small spots at Rf 0.27 and 0.47. The spot at Rf 0.10 was isolated in the same way as in Example 2, and from its TLC, NMR and IR, it was identified as 2-(6′-carboxyhexyl)-4-hydroxy-2-cyclopenten-1-one.

When this crude product was quantitatively determined using a thinchrograph (Thinchrograph TFG-10, TLC-autodetector of Iatron Company), the conversion of the product was found to be 80%. The yield was 70%.

EXAMPLE 8

After sterilization, one platinum loopful of *Aspergillus niger* IFO 6428 was inoculated in 100 ml. of a culture broth of the same composition as used in Example 1, and pre-cultured at 30°C. for 24 hours to grow the cells. Then, 50 mg of 2-(6′-carboxyhexyl)-2-cyclopenten-1-one was added aseptically, and the cultivation was continued for another 24 hours. At this time, the culture broth had a pH of 4.15. It was treated in the same way as in Example 1 to afford 39 mg of a crude product. Analysis of this crude product by TLC showed a large spot (product) at Rf 0.10, and two small spots at Rf 0.27 and 0.46. The spot at Rf 0.10 was isolated by the same procedure as in Example 2, and from its TLC, NMR and IR, it was identified as 2-(6′-carboxyhexyl)-4-hydroxy-2-cyclopenten-1-one. When the crude product was quantitatively determined using a thinchrograph (same as that used in Example 7), the conversion to the product was found to be 60%. The yield was 45%.

EXAMPLE 9

50 mg of 2-(6′-carboxyhexyl)-2-cyclopenten-1-one was placed in 100 ml. of a culture broth of the same composition as used in Example 1, and after sterilization, one platinum loopful of *Aspergillus tamarii* ATCC 1005 was inoculated, and cultivated at 28°C. for 27 hours on a rotary shaker. After the cultivation, the pH of the culture broth was 5.90. It was treated in the same way as in Example 1 to form 40 mg of a crude product. Analysis of this product by TLC showed small spots were observed at Rf 0.10 (the product) and Rf 0.46 (the starting material), and a fairly large spot at Rf 0.27. The spot at Rf 0.10 was isolated by the same method as in Example 2, and from its TLC, NMR and IR, it was identified as 2-(6′-carboxyhexyl)-4-hydroxy-2-cyclopenten-1-one.

EXAMPLE 10

50 mg of 2-(6′-carboxyhexyl)-2-cyclopenten-1-one was placed in 100 ml. of a culture broth of the same composition as in Example 1, and after sterilization, one platinum loopful of *Aspergillus flavus* ATCC 12073 was inoculated, and cultured at 28°C. for 27 hours on a rotary shaker. After the cultivation, the cuture broth had a pH of 6.45. It was treated in the same way as in Example 1 to afford 43 mg of a crude product. Analysis of the crude product by TLC showed a small spot at Rf 0.10 (the product) and Rf 0.46 (the starting material), a fairly large spot at Rf 0.27, and some small spots elsewhere. The spot of Rf 0.10 was isolated by the same method as in Example 2, and from its TLC, NMR and IR, it was identified as 2-(6′-carboxyhexyl)-4-hydroxy-2-cyclopenten-1-one.

EXAMPLE 11

53 mg of 2-(6′-carbomethoxyhexyl)-2-cyclopenten-1-one was placed in 120 ml. of a culture broth of the same composition as in Example 1, and after sterilization, one platinum loopful of *Aspergillus niger* ATCC 9142 was inoculated, and cultivated at 30°C. for 24 hours on a rotary shaker. It was treated in the same way as in Example 1 to afford 20 mg of a crude product. Analysis of the crude product by TLC showed a spot of the medium size at Rf 0.10 and 0.29, a small spot at 0.50, and a large spot at Rf 0.63 (the starting material). These were isolated by the same method as in Example 2. The spot at Rf 0.10 on TLC was identified from its NMR and IR as 2-(6′-carboxyhexyl)-4-hydroxy-2-cyclopenten-1-one, and the spot at Rf 0.29 on TLC was identified from its NMR and IR as 2-(6′-carbomethoxyhexyl)-4-hydroxy-2-cyclopenten-1-one.

EXAMPLE 12

50 mg of 2-(6′-carboethoxyhexyl)-2-cyclopenten-1-one was placed in 100 ml. of a culture broth of the same composition as in Example 1, and after sterilization, one platinum loopful of *Aspergillus niger* ATCC 9142 was inoculated, and cultivated at 28°C. for 27 hours on a rotary shaker. It was treated in the same way as in Example 1 to afford 28 mg of a crude product. The crude product was carefully hydrolyzed at room temperature using a 0.5N aqueous solution of sodium hydroxide, and extracted and isolated by a customary method. Analysis of the product by TLC showed a spot at Rf 0.10. When it was isolated by the same method as in Example 2, it was identified from its TLC, NMR and IR as 2-(6′-carboxyhexyl)-4-hydroxy-2-cyclopenten-1-one.

EXAMPLE 13

325 mg of 2-(3′-carboxypropyl)-2-cyclopenten-1-one was divided into five equal portions, and these portions were placed in five 500 ml. three-necked flasks each containing 100 ml. of a culture broth of the same composition as used in Example 1, and after sterilization, one platinum loopful of *Aspergillus niger* ATCC 9142 was cultivated in it at 28°C. for 7 days on a rotary shaker. After the cultivation, the pH of the culture broth was 3.32. These culture broths were combined, and treated in the same way as in Example 1 to afford 297 mg of a crude product. Analysis of the crude product by TLC showed a small spot at Rf 0.07, a spot of medium size at Rf 0.38 (the starting material), and some spots elsewhere.

The crude product was separated by column chromatography (carrier: silica gel, developing solvent: benzene-ethyl acetate-methanol), and 21 mg of a component having a spot at Rf 0.07 on TLC was obtained. This compound had the following characteristics.

TLC: Rf 0.07
NMR [60 MHz, $CDCl_3$, δ (ppm)]:
near 1.40 (2H; methylene group)

near 2.5 (6H; carbonyl group or methylene group adjacent to the double bond)

near 4.0 (1H; methine proton to which a hydroxyl group is attached)

6.20 (2H; proton of carboxyl group and hydroxyl group)

7.35 (1H; olefin proton)

IR (liquid film, cm$^{-1}$):

3300 (hydroxyl group, carboxyl group)

1700 (carboxyl group)

1680, 1620 (conjugated enone)

UV (λmax, in methanol): 229 nm

From the above spectrum data, this product was identified as 2-(3′-carboxypropyl)-4-hydroxy-2-cyclopenten-1-one.

EXAMPLE 14

437 mg of 2-carboxymethyl-2-cyclopenten-1-one was divided into seven equal portions, and these portions were placed in seven three-necked flasks each having a capacity of 500 ml. and containing 100 ml. of a culture broth of the same composition as used in Example 1. After sterilizing at 120°C. for 10 minutes, one platinum loopful of *Aspergillus niger* ATCC 9142 was cultivated at 28°C. for 7 days on a rotary shaker. After the cultivation, the culture broth had a pH of 3.14 ± 0.2. These culture broths were combined, and treated in the same way as in Example 1 to form 308 mg of a crude product. Analysis of this crude product by TLC showed a small spot in the vicinity of Rf 0.05, a spot of medium size at Rf 0.30 (the starting material), and some other small spots elsewhere.

In the same way as in Example 2, 31 mg of the spot corresponding to Rf 0.05 was isolated. The isolated product had the following characteristics.

TLC: Rf = 0.05

NMR [60 MHz, CDCl$_3$, δ (ppm)]:

near 2.5 (2H, methylene group adjacent to carbonyl)

3.10 (2H, methylene group bonded to the carboxyl group)

near 4.0 (1H; methyl proton to which a hydroxyl group is attached)

6.20 (2H; proton of carboxyl group and hydroxyl group)

7.30 (1H; olefin proton)

IR (liquid film, cm$^{-1}$):

3300 (hydroxyl group, carboxyl group)

1700 (carboxyl group)

1690, 1635 (conjugated enone)

From the above spectrum data, this product was identified as 2-carboxymethyl-4-hydroxy-2-cyclopenten-1-one.

What we claim is:

1. A process for preparing hydroxycyclopentenone derivatives, which comprises cultivating a microorganism belonging to the genus Aspergillus in a medium containing a cyclopentenone derivative expressed by the formula (1)

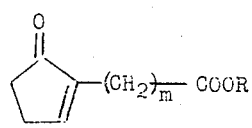

wherein R is a hydrogen atom or a lower alkyl group, and m is an integer of 1 to 6, to form in said medium a hydroxycyclopentenone derivative expressed by the formula (2)

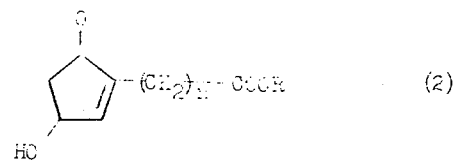

wherein R is the same as defined above, and n is equal to m, or (m − 2) when m is from 3 to 6, and then recovering the hydrocyclopentenone derivative.

2. The process of claim 1 wherein said microorganism is at least one strain selected from *Aspergillus niger*, *Aspergillus tamarii* and *Aspergillus flavus*.

3. The process of claim 1 wherein R in the formulae (1) and (2) is selected from the group consisting of a hydrogen atom, a methyl group and an ethyl group.

4. The process for preparing hydroxycyclopentenone derivatives according to claim 1 which comprises cultivating at least one strain selected from the group consisting of *Aspergillus niger*, *Aspergillus tamarii* and *Aspergillus flavus* in a culture medium containing a cyclopentenone derivative expressed by the following formula (1-a)

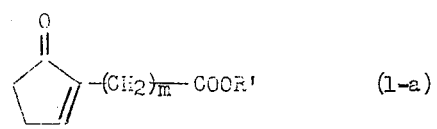

wherein R′ is a member selected from the group consisting of a hydrogen atom, a methyl group and an ethyl group, and m is an integer of 1 to 6, to form a hydroxycyclopentenone derivative expressed by the formula (2-a)

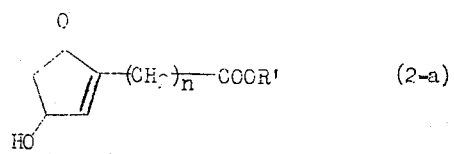

wherein R′ is the same as defined above with respect to formula (1-a), and n is equal to m or (m − 2) when m is from 3 to 6, and then recovering the hydroxycyclopentenone derivative.

5. The process of claim 1 wherein m is 6.

6. The process of claim 4 wherein m is 6.

7. The process of claim 2 wherein the microorganism is *Aspergillus niger*.

8. The process of claim 4 wherein the microorganism is *Aspergillus niger*.

9. The process of claim 4 wherein R′ is hydrogen.

10. The process of claim 1 wherein the cyclopentenone derivative is 2-(6′-carboxyhexyl)-2-cyclopenten-1-one.

11. The process of claim 1 wherein the cyclopentenone derivative is 2-(3′-carboxypropyl)-2-cyclopenten-1-one.

12. The process of claim 1 wherein the cyclopentenone derivative is 2-carboxymethyl-2-cyclopenten-1-one.

* * * * *